(12) United States Patent
Eberle

(10) Patent No.: US 8,968,636 B2
(45) Date of Patent: *Mar. 3, 2015

(54) STRETCH ROD SYSTEM FOR LIQUID OR HYDRAULIC BLOW MOLDING

(75) Inventor: Theodore F. Eberle, Ann Arbor, MI (US)

(73) Assignee: Discma AG, Hunenberg (CH)

( * ) Notice: Subject to any disclaimer, the term of this patent is extended or adjusted under 35 U.S.C. 154(b) by 448 days.

This patent is subject to a terminal disclaimer.

(21) Appl. No.: 13/267,979

(22) Filed: Oct. 7, 2011

(65) Prior Publication Data

US 2012/0091635 A1    Apr. 19, 2012

Related U.S. Application Data

(60) Provisional application No. 61/393,411, filed on Oct. 15, 2010.

(51) Int. Cl.
*B29C 49/08*  (2006.01)
*B29C 49/12*  (2006.01)
*B29C 49/00*  (2006.01)
*B29C 49/10*  (2006.01)
*B29K 23/00*  (2006.01)
*B29K 67/00*  (2006.01)
*B29C 49/06*  (2006.01)
*B29C 49/22*  (2006.01)

(52) U.S. Cl.
CPC ............ *B29C 49/0073* (2013.01); *B29C 49/08* (2013.01); *B29C 49/10* (2013.01); *B29K 2023/06* (2013.01); *B29K 2023/12* (2013.01); *B29K 2067/003* (2013.01); *B29C 49/06* (2013.01); *B29C 49/22* (2013.01); *B29C 2049/1219* (2013.01); *B29C 2049/1238* (2013.01)
USPC ............................ 264/532; 264/531; 264/523

(58) Field of Classification Search
None
See application file for complete search history.

(56) References Cited

U.S. PATENT DOCUMENTS

| | | | |
|---|---|---|---|
| 3,267,185 A | 8/1966 | Freeman, Jr. |
| 3,268,635 A | 8/1966 | Kraus et al. |
| 3,993,427 A | 11/1976 | Kauffman et al. |
| 4,039,641 A | 8/1977 | Collins |
| 4,177,239 A | 12/1979 | Gittner et al. |
| 4,321,938 A | 3/1982 | Siller |

(Continued)

FOREIGN PATENT DOCUMENTS

| EP | 0849514 | 6/1998 |
|---|---|---|
| EP | 1529620 | 5/2005 |

(Continued)

OTHER PUBLICATIONS

International Search Report and Written Opinion dated May 30, 2012 in corresponding International Patent Application No. PCT/US2011/056057 (six pages).

(Continued)

*Primary Examiner* — Monica Huson
(74) *Attorney, Agent, or Firm* — Harness, Dickey & Pierce, P.L.C.

(57) ABSTRACT

A mold device and a method related thereto for forming a plastic container from a preform. The mold device comprises a mold defining a mold cavity, a stretch initiation rod system for engaging an interior portion of the preform to define a stretch initiation area, and a centrally disposed pressure source positionable within the preform for introducing a pressurized fluid.

15 Claims, 4 Drawing Sheets

(56) References Cited

U.S. PATENT DOCUMENTS

| | | | |
|---|---|---|---|
| 4,432,720 A | 2/1984 | Wiatt et al. | |
| 4,457,688 A | 7/1984 | Calvert et al. | |
| 4,490,327 A | 12/1984 | Calvert et al. | |
| 4,499,045 A | 2/1985 | Obsomer | |
| 4,539,172 A | 9/1985 | Winchell et al. | |
| 4,615,667 A | 10/1986 | Roy | |
| 4,725,464 A | 2/1988 | Collette | |
| 4,883,631 A | 11/1989 | Ajmera | |
| 4,935,190 A | 6/1990 | Tennerstedt | |
| 5,129,815 A | 7/1992 | Miyazawa et al. | |
| 5,269,672 A | 12/1993 | DiGangi, Jr. | |
| 5,389,332 A | 2/1995 | Amari et al. | |
| 5,403,538 A * | 4/1995 | Maeda | 264/530 |
| 5,540,879 A | 7/1996 | Orimoto et al. | |
| 5,599,496 A | 2/1997 | Krishnakumar et al. | |
| 5,611,987 A | 3/1997 | Kato et al. | |
| 5,622,735 A | 4/1997 | Krishnakumar et al. | |
| 5,635,226 A | 6/1997 | Koda et al. | |
| 5,681,520 A | 10/1997 | Koda et al. | |
| 5,687,550 A | 11/1997 | Hansen et al. | |
| 5,824,237 A | 10/1998 | Stumpf et al. | |
| 5,962,039 A | 10/1999 | Katou et al. | |
| 6,214,282 B1 | 4/2001 | Katou et al. | |
| 6,277,321 B1 | 8/2001 | Vailliencourt et al. | |
| 6,485,670 B1 | 11/2002 | Boyd et al. | |
| 6,502,369 B1 | 1/2003 | Andison et al. | |
| 6,692,684 B1 | 2/2004 | Nantin et al. | |
| 6,729,868 B1 | 5/2004 | Vogel et al. | |
| 6,749,415 B2 | 6/2004 | Boyd et al. | |
| 6,767,197 B2 | 7/2004 | Boyd et al. | |
| 7,141,190 B2 | 11/2006 | Hekal | |
| 7,314,360 B2 | 1/2008 | Koda et al. | |
| 7,473,388 B2 | 1/2009 | Desanaux et al. | |
| 7,553,441 B2 | 6/2009 | Shi | |
| 7,914,726 B2 | 3/2011 | Andison et al. | |
| 7,981,356 B2 | 7/2011 | Warner et al. | |
| 8,017,064 B2 | 9/2011 | Andison et al. | |
| 8,096,483 B2 | 1/2012 | Riney | |
| 2001/0010145 A1 | 8/2001 | Tawa et al. | |
| 2005/0067002 A1 | 3/2005 | Jones | |
| 2005/0140036 A1 | 6/2005 | Hirota et al. | |
| 2005/0206045 A1 | 9/2005 | Desanaux et al. | |
| 2006/0097417 A1 | 5/2006 | Emmer | |
| 2006/0231646 A1 | 10/2006 | Geary, Jr. | |
| 2008/0029928 A1 * | 2/2008 | Andison et al. | 264/238 |
| 2008/0254160 A1 | 10/2008 | Rousseau et al. | |
| 2008/0271812 A1 | 11/2008 | Stefanello et al. | |
| 2010/0084493 A1 | 4/2010 | Troudt | |
| 2010/0213629 A1 | 8/2010 | Adriansens | |
| 2010/0303946 A1 | 12/2010 | Voth | |
| 2011/0265433 A1 | 11/2011 | Chauvin et al. | |
| 2012/0061885 A1 | 3/2012 | Maki et al. | |

FOREIGN PATENT DOCUMENTS

| | | |
|---|---|---|
| EP | 1577258 | 9/2005 |
| EP | 1688234 | 8/2006 |
| FR | 2887525 | 12/2006 |
| JP | 57123027 | 7/1982 |
| JP | 63-249616 | 10/1988 |
| JP | 08-039656 | 2/1996 |
| JP | 09057834 | 3/1997 |
| JP | 09099477 | 4/1997 |
| JP | 10-071641 | 3/1998 |
| JP | 10-217258 | 8/1998 |
| JP | 09-272147 | 1/2000 |
| JP | 2000-043129 | 2/2000 |
| JP | 2004-122457 | 4/2004 |
| JP | 2005-254704 | 9/2005 |
| JP | 2007-290772 | 11/2007 |
| JP | 2005-529002 | 9/2009 |
| KR | 10-0147442 | 8/1998 |
| KR | 2006-0105883 | 10/2006 |
| KR | 10-2006-0128062 | 12/2006 |
| WO | WO02/24435 | 3/2002 |
| WO | WO03/095179 | 11/2003 |
| WO | WO2004/065105 | 8/2004 |
| WO | WO2005/044540 | 5/2005 |
| WO | WO2007/120807 | 10/2007 |

OTHER PUBLICATIONS

International Search Report and Written Opinion dated Jun. 15, 2012 in corresponding International Patent Application No. PCT/US2011/051293 (eight pages).

International Search Report and Written Opinion dated Apr. 17, 2012 in corresponding PCT International Patent Application No. PCT/US2011/051284 (nine pages).

International Search Report and Written Opinion dated Apr. 18, 2012 in corresponding PCT International Patent Application No. PCT/US2011/051289 (nine pages).

International Search Report and Written Opinion dated Sep. 28, 2012 in corresponding International Patent Application No. PCT/US2012/024954 (six pages).

International Search Report and Written Opinion dated May 8, 2012 in corresponding International Patent Application No. PCT/US2011/054584 (six pages).

International Search Report and Written Opinion dated May 9, 2012 in corresponding International Patent Application No. PCT/US2011/056053 (six pages).

International Search Report and Written Opinion dated Oct. 29, 2012 in corresponding International Patent Application No. PCT/US2012/024950 (seven pages).

* cited by examiner

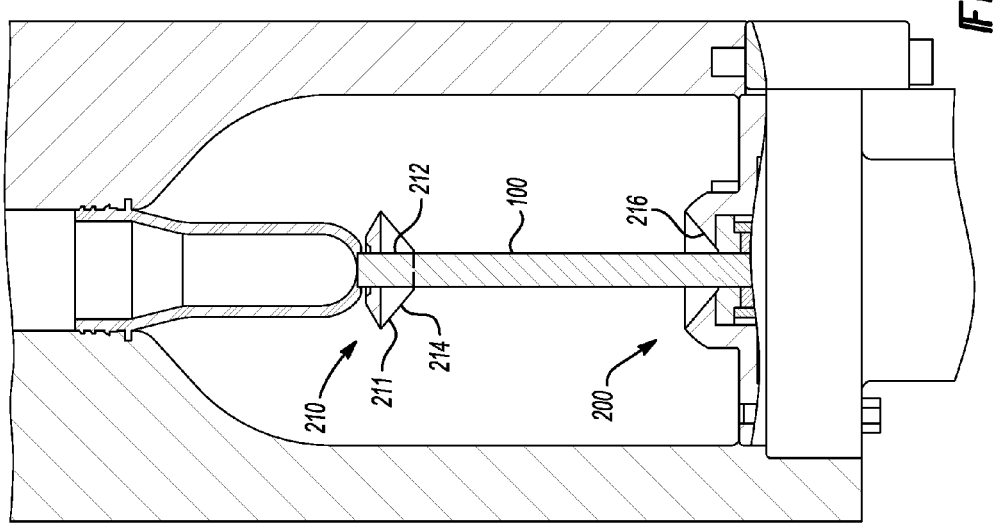
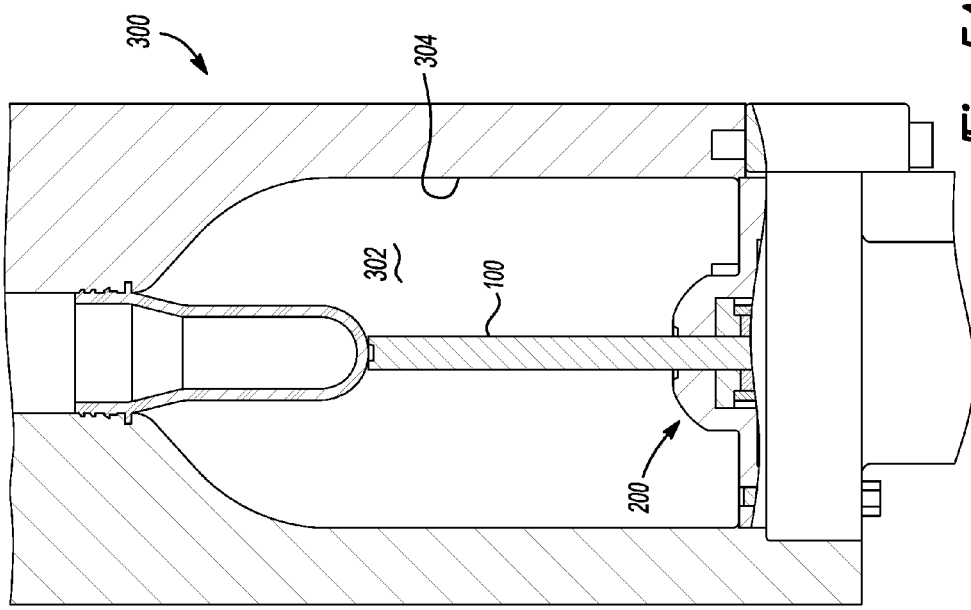

STRETCH ROD SYSTEM FOR LIQUID OR HYDRAULIC BLOW MOLDING

CROSS-REFERENCE TO RELATED APPLICATIONS

This application claims the benefit of U.S. Provisional Application No. 61/393,411, filed on Oct. 15, 2010. The entire disclosure of the above application is incorporated herein by reference.

FIELD

This disclosure generally relates to forming a container for retaining a commodity, such as a solid or liquid commodity. More specifically, this disclosure relates to a centering device for use with a forming apparatus for forming blown plastic containers that minimizes contamination and maintains a preform in a desired orientation.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

However, in some prior art configurations, preforms can become damaged or unsanitized during mechanical processing. That is, in some configurations, it has been found that preforms can become misaligned with the mechanical device during stretching and consequently lead to premature contact with the mold cavity and/or contact with other mechanical devices. This misalignment thus can lead to defects and wastage.

In some cases, thermal processing is used which involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present disclosure, a mold device and a method related thereto for forming a plastic container from a preform is provided. The mold device comprises a mold defining a mold cavity, a stretch initiation rod system for engaging an interior portion of the preform to define a stretch initiation area, and a centrally disposed pressure source positionable within the preform for introducing a pressurized fluid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5A illustrates a mold device having a central rod according to the present teachings; and FIG. 5B illustrates a mold device having a centering feature coupled with the central rod according to the present teachings.

Corresponding reference numerals indicate corresponding parts throughout the several views of the drawings.

DETAILED DESCRIPTION

Figure 1D:
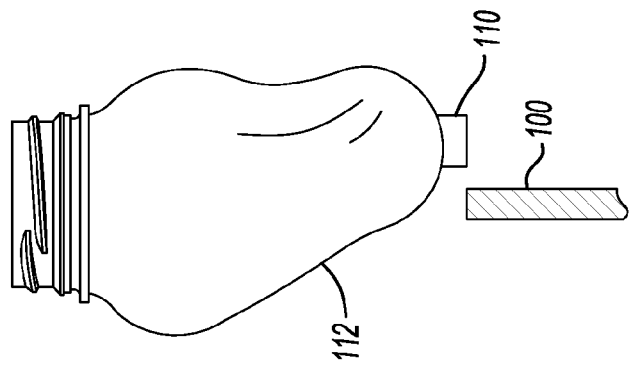
FIG. 1D illustrates a schematic side view illustrating a slipped condition of a central rod.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide for a stretch blow molding machine having a centering device operable for engaging a preform container during the molding process and a stretch initiation device operable to create a stretch initiation area on the preform container. The stretch initiation device, unlike molding machines, can be used to initiate the stretching of the preform and encourage the preform to engage the centering device. The centering device of the present teachings, unlike conventional molding machines, provides improved control for maintaining the preform in a predetermined orientation to minimize contact of the stretch rod to the preform, which could result in contamination of the finished container.

As will be discussed in greater detail herein, the shape of the container described in connection with the present teachings can be any one of a number of variations. By way of non-limiting example, the container of the present disclosure can be configured to hold any one of a plurality of commodities, such as beverages, food, or other hot-fill type materials.

It should be appreciated that the size and the exact shape of the centering device are dependent on the size and shape of the container to be formed. Therefore, it should be recognized that variations can exist in the presently described designs.

The present teachings relate to the forming of one-piece plastic containers. Generally, these containers, after formation, generally define a body that includes an upper portion having a cylindrical sidewall forming a finish. Integrally formed with the finish and extending downward therefrom is a shoulder portion. The shoulder portion merges into and provides a transition between the finish and a sidewall portion. The sidewall portion extends downward from the shoulder portion to a base portion having a base. An upper transition portion, in some embodiments, may be defined at a transition between the shoulder portion and the sidewall portion. A lower transition portion, in some embodiments, may be defined at a transition between the base portion and the sidewall portion.

The exemplary container may also have a neck. The neck may have an extremely short height, that is, becoming a short extension from the finish, or an elongated height, extending between the finish and the shoulder portion. The upper portion can define an opening. Although the container is shown as a drinking container and a food container, it should be appreciated that containers having different shapes, such as sidewalls and openings, can be made according to the principles of the present teachings.

The finish of the plastic container may include a threaded region having threads, a lower sealing ridge, and a support ring. The threaded region provides a means for attachment of a similarly threaded closure or cap (not illustrated). Alternatives may include other suitable devices that engage the finish of the plastic container, such as a press-fit or snap-fit cap for example. Accordingly, the closure or cap (not illustrated) engages the finish to preferably provide a hermetical seal of the plastic container. The closure or cap (not illustrated) is preferably of a plastic or metal material conventional to the closure industry and suitable for subsequent thermal processing.

The container can be formed according to the principles of the present teachings. A preform version of the container can include a support ring, which may be used to carry or orient the preform through and at various stages of manufacture. For example, the preform may be carried by the support ring, the support ring may be used to aid in positioning the preform in a mold cavity, or the support ring may be used to carry an intermediate container once molded. At the outset, the preform may be placed into the mold cavity such that the support ring is captured at an upper end of the mold cavity.

In general, as illustrated in FIGS. 5A and 5B, the mold 300 can comprise a mold cavity 302 having an interior surface 304 corresponding to a desired outer profile of the blown container. More specifically, the mold cavity according to the present teachings defines a body forming region, an optional moil forming region and an optional opening forming region. Once the resultant structure, hereinafter referred to as an intermediate container, has been formed in some embodiments, any moil created by the moil forming region may be severed and discarded. It should be appreciated that the use of a moil forming region and/or opening forming region are not necessarily in all forming methods or according to all embodiments of the present teachings.

In one example, a machine places the preform heated to a temperature between approximately 190° F. to 250° F. (approximately 88° C. to 121° C.) into the mold cavity. The mold cavity may be heated to a temperature between approximately 250° F. to 350° F. (approximately 121° C. to 177° C.). An internal stretch rod apparatus can stretch or extend the heated preform within the mold cavity to a length approximately that of the intermediate container thereby molecularly orienting the polyester material in an axial direction generally corresponding with the central longitudinal axis of the container. While the stretch rod extends the preform, fluid (e.g. liquid, such as the final liquid commodity; air; and the like) from a centrally disposed pressure source, having a pressure between 300 PSI to 600 PSI (2.07 MPa to 4.14 MPa), assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized fluid holds the mostly biaxial molecularly oriented polyester material against the mold cavity for a period of approximately two (2) to five (5) seconds before removal of the intermediate container from the mold cavity. This process is known as heat setting and results in a heat-resistant container suitable for filling with a product at high temperatures.

With particular reference to FIGS. 1A-4B, stretch blow molding systems can employ a central interior stretch initiation rod system 20 that can engage an interior feature or surface of a preform 112 and/or a central exterior rod system 100 that can engage an exterior feature 110, or other portion, of the preform 112. It should be appreciated that according to the principles of the present teachings, central interior stretch initiation rod system 20 and central exterior rod system 100 can be used separately or in combination. Moreover, central interior stretch initiation rod system 20 and central exterior rod system 100 can be used independently and/or simultaneously.

With particular reference to FIGS. 1A, 3A, 3B, 4A, and 4B, in some embodiments, stretch initiation rod system 20 can be raised and lowered relative to preform 112 to provide a mechanical urging force against an interior surface of preform 112. Stretch initiation rod system 20 can comprise a rod member 22 having a distal tip 24, an elongated shaft 26, and a drive system 28 coupled to the elongated shaft 26 to actuate distal tip 24 between a retracted (see FIGS. 3B and 4A) and an extended (see FIGS. 1A, 3A, and 4B) position. Drive system 28 can comprise a pneumatic drive system, a servo drive system, or other known system for creating motion of rod member 22. In some embodiments, drive system 28 includes a servo or positive stop to provide positioning information. Moreover, in some embodiments, drive system 28 can be used for real-time tracking a position and/or drive speed of rod member 22 to provide real-time control. Still further, it should be appreciated that although rod member 22 is described and illustrated as being cylindrical with a rounded tip, other shapes and tips are envisioned, including but not limited to conical, non-uniform, tapered, pointed, flattened, and the like or can be varied to define a predetermined volume.

It should be noted, however, that stretch initiation rod system 20 can be separate from or joined with a typical central rod of a blow molding system. That is, a stretch initiation rod system 20 can be separately formed or integrally formed with the central rod. Stretch initiation rod system 20 can, however, employ distal tip 24 to engage or otherwise contact preform 112 to define the stretch initiation area and/or prestretch. By way of non-limiting example, prestretches of about 40 mm have been found to be beneficial, however other prestretch lengths, such as the distance X of FIG. 1A, may be appropriate. This insures a known stretching response and material distribution during molding, rather than the unpredictable stretching response common with conventional molding systems. This material distribution can include non-uniform distribution for predetermined design criteria.

Figure 1C:
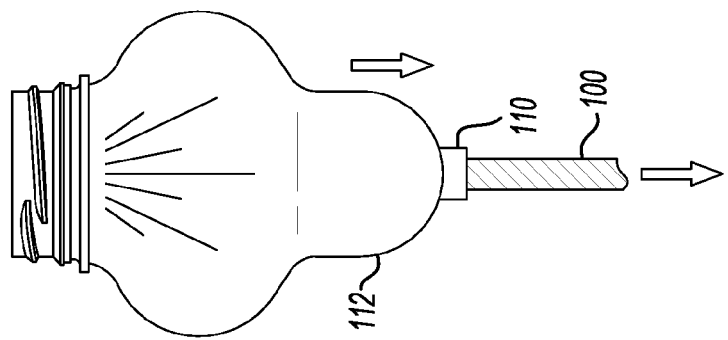
FIGS. 1A-1C illustrate a series of schematic side views illustrating a central rod guiding a preform during the forming process (not to scale)
Figure 1B:
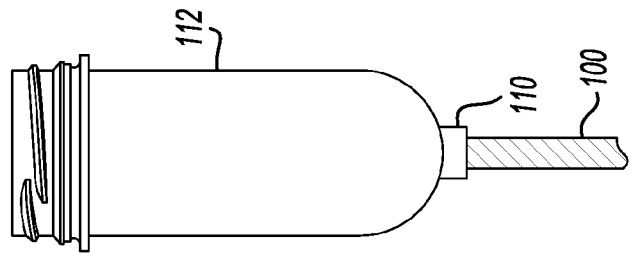
Figure 1A:
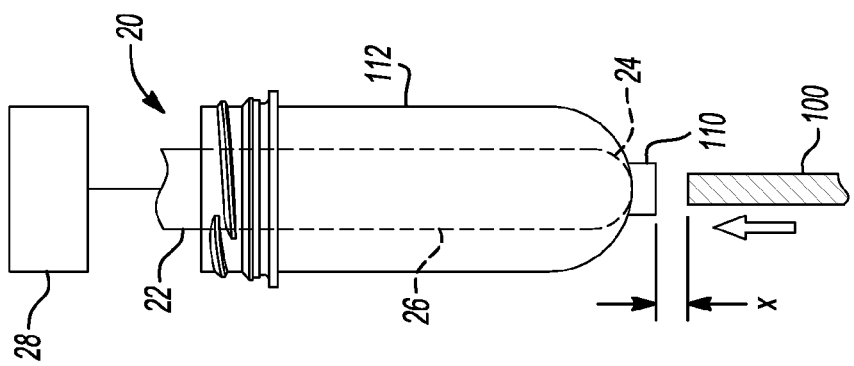
Figure 2A:
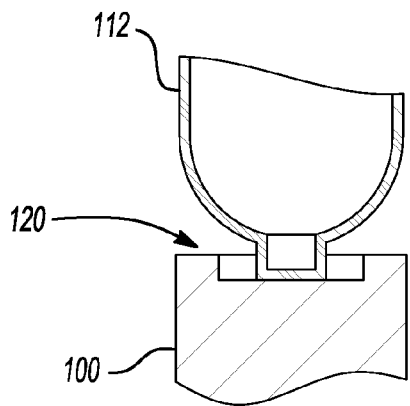
FIGS. 2A-2D illustrate a plurality of locating features according to the principles of the present teachings.
Figure 2B:
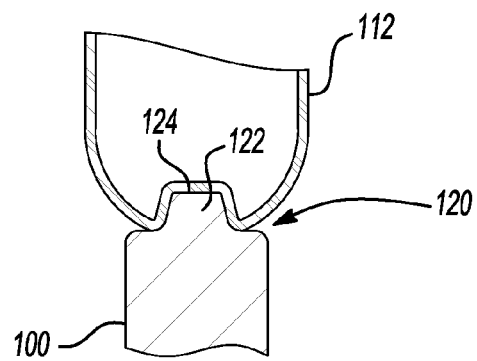
Figure 2C:
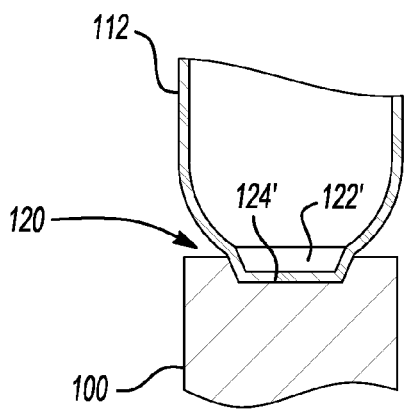
Figure 2D:
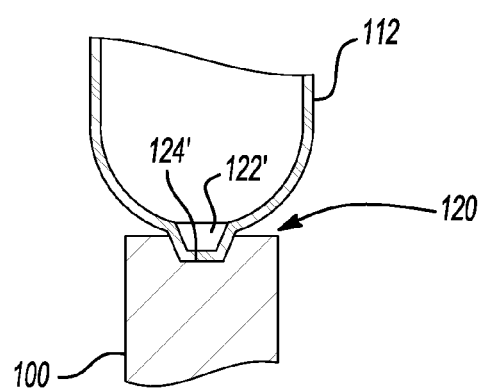

With reference to FIGS. 1A-1D, central exterior rod system 100 can be used, ideally, to maintain preform 112 in a predetermined orientation during the stretch blow forming process as illustrated in FIGS. 1A-1C. Central interior stretch initiation rod 20 can be used, ideally, to initiate the forming process. In this way, the preform 112 is initially stretched to achieve a predetermined molding response using stretch initiation rod system 20 and then centrally maintained by central exterior rod system 100 relative to the stretch rod and/or stretch initiation rod system 20 extending therein, thereby ensuring that the stretch rod(s) does not contact the inside of the preform. Such contact of the stretch rod within the preform can cause contamination of the resultant container, thereby requiring the resultant container to be discarded or sanitized.

Figures 3A, 3B:
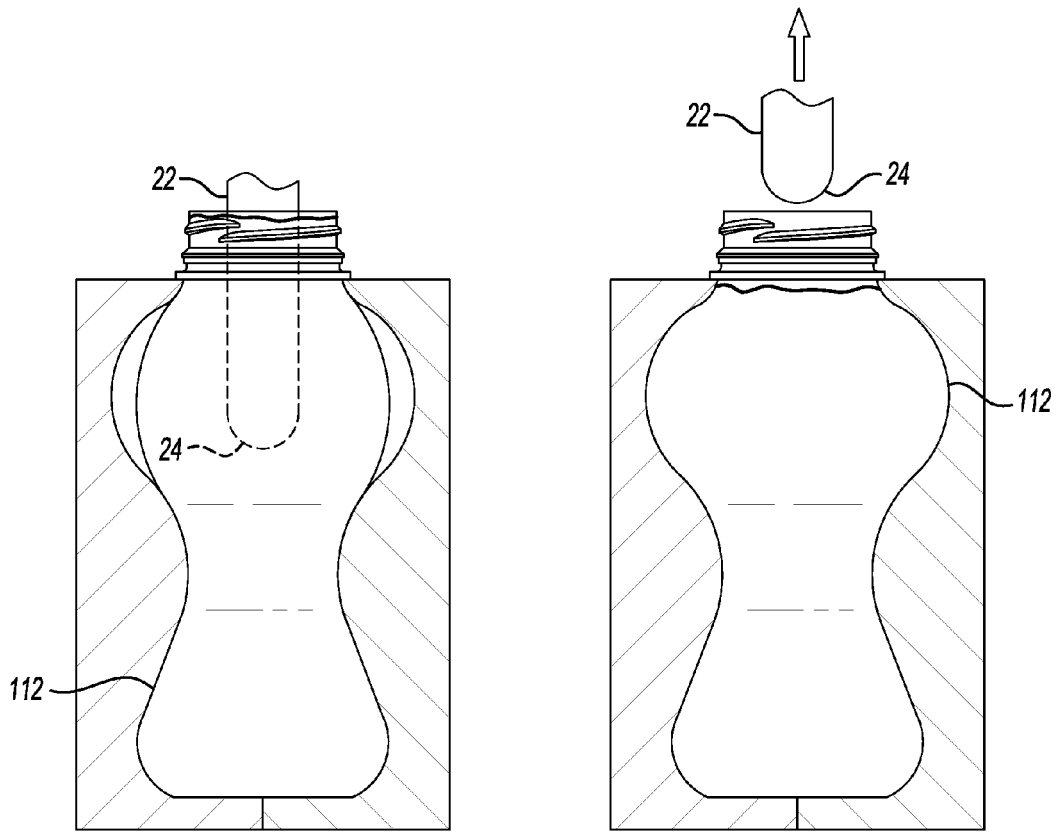
FIGS. 3A-3B illustrate a stretch initiation rod being withdrawn from a container to create a fluid headspace.

In some embodiments, stretch initiation rod system 20 can be used to achieve a precise headspace within the final filled container. Specifically, as seen in FIGS. 3A-3B, stretch initiation rod system 20 can be actuated and/or sized such that following formation of the preform 112 into the final container (which is done with the final fill commodity), retraction of rod member 22 can represent a precise volume (that is, the volume of rod member 22 disposed within the final fill commodity) that when retracted provides the desired headspace for packaging and shipment. Such precise headspace is achieved without complex valve systems and the like.

Figures 4A, 4B:
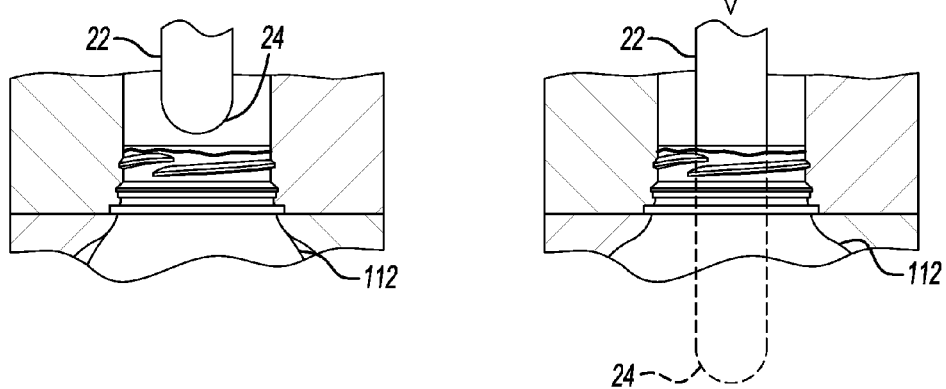
FIGS. 4A-4B illustrate a stretch initiation rod being inserted into a container to create a fluid pressure spike.

Moreover, in some embodiments, stretch initiation rod system 20 can be used to achieve a fluid pressure spike to aid in the shaping of preform 112 or container. Specifically, as seen in FIGS. 4A-4B, stretch initiation rod system 20 can be actuated such that the fluid volume displaced by rod member 22 is greater than a headspace within the preform 112 or finished bottle, such that insertion of rod member 22 into the preform 112 or container, having a contained and generally fixed volume, causes a pressure spike within the preform 112 or container. Such pressure spikes can be used to define final details within the preform 112 or container.

Turning now to FIG. 1D, in some embodiments, preform 112 may form in such a way as to slip off or become disengaged from the central exterior rod system 100. This can often lead to damage to the preform by contact with the central exterior rod system 100 and/or contamination with the internal stretch rod.

To overcome this issue, with reference to FIGS. 2A-2D, in some embodiments, central exterior rod system 100 can comprise a locating feature 120 for engaging or otherwise contacting the preform 112. Locating feature 120 can comprise, in some embodiments, a protruding portion 122 defining a first shape. A corresponding depression 124, having a complementary shape to the first shape, can be formed as part of preform 112. In this way, protruding portion 122 can be positively received within depression 124 to define a reliable connection therebetween. In some embodiments, protruding portion 122 is sized and shaped to closely conform to depression 124 to minimize lateral movement (that is, movement in a hoop direction). The shape of protruding portion 122, and consequently depression 124, can be cylindrical (FIGS. 2A and 2B), tapered (FIGS. 2C and 2D), wide (FIG. 2C), narrow (FIGS. 2B and 2D), or any other shape/size that provides a reliable connection between central exterior rod system 100 and preform 112. It should be appreciated that locating feature 120 can define a reverse orientation (indicated with similar primed reference numbers) to those already described in that the locating feature 120 can comprise a protruding portion extending from the preform (FIGS. 2C and 2D) for engaging a depression formed in the central exterior rod system 100.

Still further, in some embodiments as illustrated in FIGS. 5A-5B, central exterior rod system 100 can extend from mold device 200 as a generally cylindrical member (FIG. 5A) or can include a centering feature 210 located along a portion of central exterior rod system 100. In some embodiments, centering feature 210 can be an oversized head member 211 disposed on distal end 212 of central exterior rod system 100. In some embodiments, the oversized member can include a tapered portion 214, such as conical portion, that is sized to be received and/or captured within a conical depression 216 formed in the mold device 200. In this way, upon retraction of central exterior rod system 100, tapered portion 214 can be centrally received within conical depression 216 to ensure proper aligned of the now-expand preform 112 or resultant container. It should also be recognized that in some embodiments, oversized head member 211 can be shaped to form part of the mold device and, at least in part, impart a shape upon preform 112 during formation of the resultant container.

Alternatively, other manufacturing methods, such as for example, extrusion blow molding, one step injection stretch blow molding and injection blow molding, using other conventional materials including, for example, thermoplastic, high density polyethylene, polypropylene, polyethylene naphthalate (PEN), a PET/PEN blend or copolymer, and various multilayer structures may be suitable for the manufacture of plastic containers and used in connection with the principles of the present teachings.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of forming a plastic container from a preform, said method comprising:
   heating a preform to a temperature between 190° F. and 250° F.;
   heating a mold cavity to a temperature between 250° F. and 350° F.;
   inserting said preform within said mold cavity;
   actuating a stretch initiation rod system to engage an interior portion of the preform to define a stretch initiation area;
   introducing a pressurized fluid into said preform to expand said preform to closely conform to said mold cavity; and
   actuating a central exterior rod such that a locating feature formed on said central exterior rod engages an exterior feature of said preform to generally maintain a predetermined orientation of said preform during at least a portion of said introducing said pressurized fluid.

2. The method according to claim 1, further comprising:
   actuating said stretch initiation rod system following at least a portion of said introducing said pressurized fluid to create a headspace within the container.

3. The method according to claim 1, further comprising:
   actuating said stretch initiation rod system following at least a portion of said introducing said pressurized fluid to create a fluid pressure spike within the container.

4. The method according to claim 1, further comprising:
   maintaining a predetermined pressure within said preform following said introducing said pressurized fluid such that said preform is held against said mold cavity for a predetermined duration.

5. The method according to claim 4 wherein said predetermined duration is between 0.1 seconds and 1.5 seconds.

6. The method according to claim 1 wherein said pressurized fluid comprises a liquid commodity that remains in the plastic container.

7. The method according to claim 1 wherein said preform is made from a thermoplastic, a high density polyethylene, a polypropylene, a polyethylene naphthalate (PEN), a PET/PEN blend, a copolymer, various multilayer structures, and any combination or blend thereof.

8. A method of forming a plastic container from a preform, said method comprising:
   heating a preform;
   inserting said preform within a mold cavity having a central longitudinal axis;
   introducing a pressurized liquid into said preform to expand said preform to closely conform to said mold cavity; and
   actuating a central exterior rod such that a locating feature formed on said central exterior rod engages an exterior feature of said preform to prevent said preform from slipping off said central exterior rod and to generally maintain a concentricity of said exterior feature of said preform with respect to said cavity central longitudinal axis during at least a portion of said introducing said pressurized liquid without substantial modification of said exterior feature of said preform.

9. The method according to claim 8, further comprising:
   actuating a stretch initiation rod system to engage an interior portion of the preform and actuating said stretch initiation rod system following at least a portion of said introducing said pressurized liquid to create a headspace within the container.

10. The method according to claim 8, further comprising:
    actuating a stretch initiation rod system to engage an interior portion of the preform and actuating said stretch initiation rod system following at least a portion of said introducing said pressurized liquid to create a fluid pressure spike within the container.

11. The method according to claim 8, further comprising:
maintaining a predetermined pressure within said preform following said introducing said pressurized liquid such that said preform is held against said mold cavity for a predetermined duration.

12. The method according to claim 11 wherein said predetermined duration is between 0.1 seconds and 1.5 seconds.

13. The method according to claim 8, further comprising the step of retracting said central exterior rod towards a bottom of said mold cavity after said engaging of said central exterior rod and during at least a portion of said introducing said pressurized liquid,
wherein said introducing, said engaging and said retracting maintain a concentricity of said exterior feature of said preform with respect to said cavity central longitudinal axis.

14. The method according to claim 8 wherein said heating a preform includes heating the preform to a temperature between 190° F. and 250° F.

15. The method according to claim 8, further comprising:
heating the mold cavity to a temperature between 250° F. and 350° F.

* * * * *